United States Patent
Hong et al.

(10) Patent No.: US 7,668,557 B2
(45) Date of Patent: Feb. 23, 2010

(54) METHODS FOR RING TONE SUPRESSION INFORMING AND FOR INFORMING A CELLULAR TELEPHONE WITH CONFIGURATION DATA

(75) Inventors: Jay Wu Hong, San Jose, CA (US); Arnold Mark Bilstad, Redwood City, CA (US)

(73) Assignee: Cisco Technology, Inc., San Jose, CA (US)

( * ) Notice: Subject to any disclaimer, the term of this patent is extended or adjusted under 35 U.S.C. 154(b) by 300 days.

(21) Appl. No.: 11/515,316

(22) Filed: Sep. 1, 2006

(65) Prior Publication Data

US 2008/0057945 A1 Mar. 6, 2008

(51) Int. Cl.
H04W 24/00 (2009.01)
H04M 3/00 (2006.01)
H04B 1/38 (2006.01)

(52) U.S. Cl. ............... 455/456.4; 455/418; 455/456.1; 455/567

(58) Field of Classification Search .............. 455/418, 455/456.1, 456.4, 419, 425
See application file for complete search history.

(56) References Cited

U.S. PATENT DOCUMENTS

| | | | |
|---|---|---|---|
| 6,212,390 B1 | 4/2001 | Rune | |
| 6,587,684 B1 | 7/2003 | Hsu et al. | |
| 6,907,254 B1 * | 6/2005 | Westfield | 455/456.4 |
| 7,043,286 B1 * | 5/2006 | Leason | 455/701 |
| 7,069,027 B2 * | 6/2006 | Miriyala | 455/456.4 |
| 7,194,278 B1 * | 3/2007 | Cook | 455/461 |
| 2006/0019645 A1 * | 1/2006 | Azimi et al. | 455/419 |
| 2006/0135140 A1 * | 6/2006 | Rothman et al. | 455/418 |
| 2007/0254633 A1 * | 11/2007 | Mathew et al. | 455/412.1 |

OTHER PUBLICATIONS

Charny, Ben. "Wi-Fi phones make a splash." Aug. 5, 2004. CNET.com. <http://news.cnet.com/Wi-Fi-phones-make-a-splash/2100-7351_3-5296745.html?tag=rtcol;relnews>.*

Layton, Julia, Marshall Brain and Jeff Tyson. "How Cell Phones Work." Nov. 14, 2000. HowStuffWorks.com. <http://electronics.howstuffworks.com/cell-phone.htm>.*

Guernsey, Lisa, Taking the Offensive Against Cell Phones, New York Times, Jan. 11, 2001.*

Efstathiou, Elias, The Mobile-Phone Silencers Controversy, Athens University of Economics and Business, Department of Computer Science, Mobile Multimedia Library, Jan. 2002.*

IEEE Std 802.11-1997 Information Technology- telecommunications And Information exchange Between Systems-Local And Metropolitan Area Networks-specific Requirements-part 11: Wireless Lan Medium Access Control (MAC) And Physical Layer (PHY) Specifications ( http://standards.ieee.org/getieee802/download/802.11-2007.pdf ) << pp. 43-46 >>.*

(Continued)

*Primary Examiner*—Nick Corsaro
*Assistant Examiner*—Larry Sternbane
(74) *Attorney, Agent, or Firm*—Stolowitz Ford Cowger LLP (57) ABSTRACT

Methods for suppressing ring tones in cellular telephones and for informing a cellular telephone with configuration data are described. The method for informing a cellular telephone includes detecting a cellular telephone that enters a space time zone associated with the network. A property of the telephone is determined. Information is sent to the telephone that relates to the telephone property and a characteristic of the network space time zone.

18 Claims, 5 Drawing Sheets

OTHER PUBLICATIONS

Kay Connelly, Ashraf Khalil, "On Negotiating Automatic Device Configuration in Smart Environments," Pervasive Computing and Communications Workshops, IEEE International Conference on, pp. 213, Second IEEE Annual Conference on Pervasive Computing and Communications Workshops, 2004.*

Westfield, Prosecution File History for U.S. Appl. No. 09/803,424, filed Mar. 8, 2001, now U.S. Patent No. 6,907,254, issued Jun. 14, 2005.

Westfield, Prosecution File History for U.S. Appl. No. 09/803,424, filed Mar. 8, 2001, now U.S. Patent No. 6,907,254, issued Jun. 14, 2005.

* cited by examiner

Fig. 5

METHODS FOR RING TONE SUPRESSION INFORMING AND FOR INFORMING A CELLULAR TELEPHONE WITH CONFIGURATION DATA

TECHNOLOGY

The present invention relates to the fields of telecommunications and networking. More specifically, embodiments of the present invention relate to methods for suppressing ring tones in cellular telephones and for informing a cellular telephone with configuration data.

BACKGROUND

Cellular telephones (cell phones) are often carried in a state that allows the phone to alert its user when a call comes in. Various ring tones provide familiar signals used to render incoming call alerts. Some modern phones allow alternatives to ring tones, such as a selection of melodies and other music or sounds, humorous, inspirational and other vocals, and the like. (Such audible incoming call alarms may be referred to generally herein as a ring tone.)

Other signals may also alert cell phone users as to incoming calls. Some phones allow their users to select a tactile means, such as a vibrating element (e.g., an integrated vibrator) as an incoming call signal. Upon sensing an incoming call, the phone alerts the user with a gentle tactile signal such as a substantially silent buzz. Some phones further allow users to combine the buzz signal with a ring tone.

Further, some phones provide visual indication signals, such as a light emitting diode (LED) emitting visibly and/or a viewable display lighting up. These visual indicators may signal the user substantially simultaneously with the ring tones and with the buzz signals.

Besides alerting the user to incoming calls, some cell phone displays may provide designated information relating to an incoming call as well. For instance, the telephone number from which the incoming call originates may be displayed. User programmed information related to the telephone number can also be displayed, such as a caller's name or pictures. Such pictures may be stored on the phone in 'JPEG' and other graphical formats, for example.

In as much as cell phones are taken by their users to all manner of places and settings, there are times and situations where ring tones may not be the best available signal. For instance, cell phones are often taken into auditoriums, classrooms, libraries and lecture halls, concert halls, opera houses, movie theaters and other performing arts centers, court rooms, houses of worship and contemplation, meetings and other places, times and/or situations that call for silence, civility and order, decorum, ceremony, observation, consideration and appreciation, etc. and the like.

In such circumstances, ring tones can be disturbing. The sounding of ring tones in such inappropriate circumstances can be destructive to the ambiance thereof. The disturbance ring tones then produce can be annoying, embarrassing and harmful. Thus, cell phones typically allow their users to silence ring tones. Some phones have an externally or quickly accessible button that can be pressed to stop a ring tone as it is sounding.

Further, many phones allow a user to configure the controls of the phone to suppress, e.g., temporarily, its ring tone capability. Thus, when entering an environment or situation wherein a ring tone sounding would be inappropriate or otherwise undesirable, users can retrieve their phone and configure it so as to prevent its ring tone from sounding and, upon exiting, reconfigure their phone to its ring tone capable state.

However, the capability of users to suppress their ring tones is not always exercised when it may be appropriate to do so. For instance, users may not be aware that they are entering a place, time, circumstance or situation where actively audible ring tone use is inappropriate. It may be that no warning as to the ring tone undesirability was given. Or perhaps the user is distracted and misses such a warning, such as a posted sign, if given. Moreover, situations and circumstances can and do change over time.

For instance, during an intermission in a lecture or performance, if a user reactivates their ring tone, they may subsequently forget to suppress it again. Thus, while configured appropriately for the duration of the intermission, upon resumption of the performance, the situational propriety of the ring tone sounding changes again, and the phone has then become inappropriately configured. Besides ring tones, other configurable characteristics of the phone are changeable as to appropriateness, favorability or other conditions over time, place, situations and circumstance.

DETAILED DESCRIPTION

Exemplary embodiments of methods for suppressing ring tones in cellular telephones and for informing a cellular telephone with configuration data are described herein. Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims.

Furthermore, in the following detailed description of exemplary embodiments of the present invention, numerous specific details are set forth in order to provide a thorough understanding of the present invention. However, one of ordinary skill in the art will realize that embodiments of the present invention may be practiced without these specific details. In other instances, well-known devices, methods, systems, processes, procedures, components, circuits and apparatus, protocols, standards, etc. have not been described in detail so as not to unnecessarily obscure aspects of the present invention.

Portions of the detailed description that follows are presented and discussed in terms of processes. Although blocks and sequencing thereof are disclosed in a flowchart figure herein (e.g., FIGS. 1, 3 & 4) describing the operations of this process, (e.g., processes 10, 30 & 20, respectively), such blocks and sequencing are exemplary. Embodiments of the present invention are well suited to performing various other blocks or variations of the blocks recited in the flowchart of the figure herein, and in a sequence, order, etc. other than that depicted and described herein, unless and except as described herein otherwise.

In one embodiment, a process for informing a cellular telephone with configuration data and for suppressing ring tones in cellular telephones is performed with a computer based system. Means for performing such a process include (but are not limited to), in various embodiments, a variety of computer and networking systems, devices, apparatus and communication media, including but not limited to access points, routers, network switches, firewalls, gateways, content and other servers, and network access control devices, including software, hardware, firmware and/or combinations thereof. In one embodiment, such a process is performed with a computer under the control of computer readable code. In one embodiment, the computer readable code that is encoded upon (e.g., within) a computer readable medium. In one embodiment, such a process includes a method for managing a network.

Portions of the description herein relate to a space time zone that is associated with a network. The space time zone described herein is dynamic and relates to a place, time, circumstance, situation and/or another characteristic, portion, region, and/or subnet of the network. For example, a performing arts venue may comprise one or more distinct space time zones that are associated with a particular wireless local area network (WLAN) such as a cell or region thereof that is associated with a cellular telephone network and a Wireless Fidelity (WiFi) WLAN that substantially conforms to Standard 802.11 a/b/g/n of the Institute for Electrical and Electronic Engineers™ (IEEE™). During a live or other performance, the performing arts venue may comprise one space time zone. And in fact, the same performing arts venue during an intermission therein may comprise another space time zone; distinct from the first. Thus, a network's space time zones may be dynamic; their characteristics may change over and/or responsively to time, space, circumstance, situation, etc.

Embodiments of the present invention relate to methods for informing a cellular telephone with configuration data and for suppressing ring tones in cellular telephones. In one embodiment, the method for informing a cellular telephone includes detecting a cellular telephone that enters a space time zone associated with the network. A property of the telephone is determined. Information is sent to the telephone that relates to the telephone property and a characteristic of the network space time zone.

Therefore, embodiments of the present invention enable networks or portions thereof to inform cell phones that they detect within a space time zone thereof as to recommendations, suggestions and the like for properties of the phone like configuration settings that are correspondingly appropriate. Thus, the capability of users to suppress their ring tones is promoted, suggested, recommended, etc. where the sounding thereof may be appropriate for the condition of the space time zone, e.g., for a characteristic thereof. The characteristics may be dynamic or static with respect to time, space, situation, condition and/or circumstance.

Exemplary Methods

Figure 1:
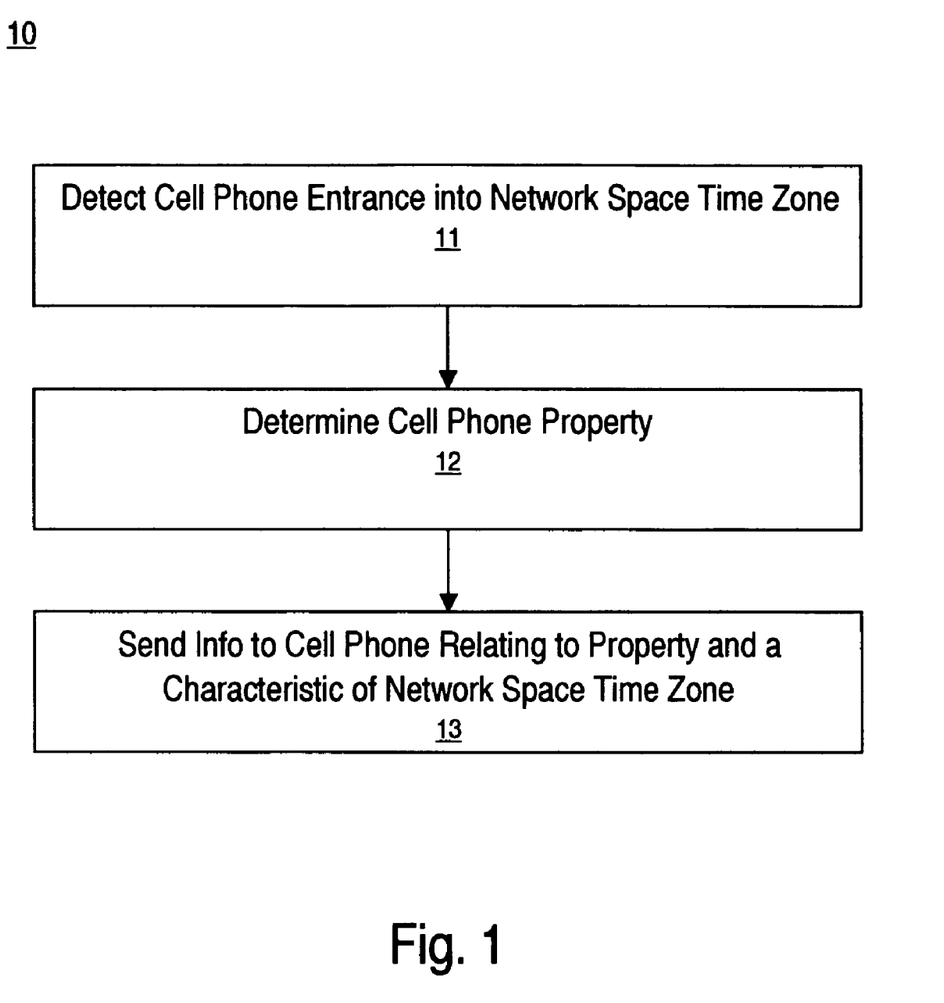
FIG. 1 depicts a FIG. 1 depicts an exemplary method for informing a cellular telephone, according to an embodiment of the present invention.

FIG. 1 depicts an exemplary method 10 for informing a cellular telephone, according to an embodiment of the present invention. Method 10 begins with block 11 wherein a cellular telephone is detected upon entering a space time zone associated with a network. In block 12, a property of the telephone is determined. In block 13, information is sent to the telephone that relates to the telephone property and a characteristic of the network space time zone, which can complete process 10. In one embodiment, the characteristic comprises a location, a time, and/or a circumstance relating to the network space time zone.

In one embodiment, the said property comprises a configuration setting of the telephone. The information can comprise a recommendation for the configuration setting. The configuration setting can comprise a status of an audible alarm of the telephone, such as a ring tone or another incoming call signal and the status can be an on/off state thereof. Thus, in one embodiment, process 10 comprises a process (e.g., method) for recommending a change for a cellular telephone feature based on an existing configuration setting thereof and a characteristic of the network space time zone.

In one embodiment, the detecting, determining and sending functions respectively described with reference to blocks 11, 12 and 13 comprise a function of a network entity. The network may comprise a wireless local area network (WLAN), in which case the entity comprises an access point thereof such as a WLAN that substantially conforms to Standard 802.11 a/b/g/n of the IEEE™. The access point in that implementation may comprise a WiFi capable transceiver, antenna, etc. The network may also or alternatively comprise a cellular telephone network cell, in which case the entity comprises a two way wireless transceiver of that cell and/or a mobile telephone switching office (MTSO) associated with that cell.

In one embodiment, the method 10 further comprises managing the network based on performing blocks 11, 12 and 13. Thus, process 10 can serve as a basis for a business process, such as charging a fee to an entity associated with the space time zone of the network to send cell phones therein information relating to their properties and characteristics of the zone.

Exemplary Cellular Telephone

Figure 2:
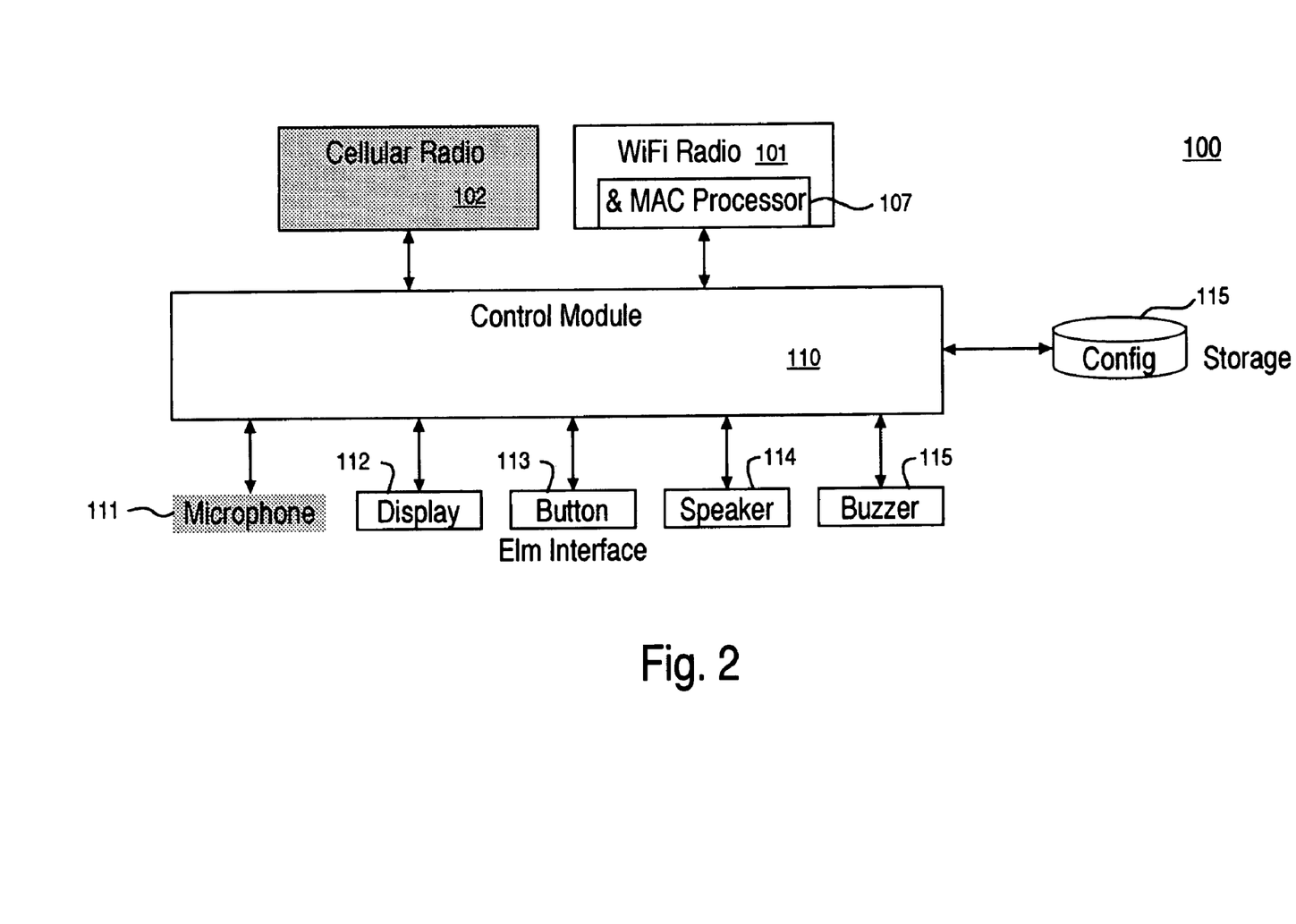
FIG. 2 depicts an exemplary cellular telephone, according to an embodiment of the present invention.

FIG. 2 depicts an exemplary cellular telephone (cell phone) 100, according to an embodiment of the present invention. Cell phone 100 essentially comprises a dual mode communications device that has a controller 110. A cellular radio transceiver 102 is coupled to controller 110 and operated therewith. Cellular radio transceiver 102 allows dual mode telephone device 100 function with a cellular telephone network. In one embodiment, the information comprises a proprietary data frame or another data frame.

Further, a Wireless Fidelity (WiFi) radio transceiver 101 is coupled to controller 110 and operated therewith. In one embodiment, WiFi radio transceiver 101 functions with a media access control (MAC) processor 107, which can be integral or discrete thereto. The WiFi radio transceiver 101 allows dual mode telephone device 100 to function with a wireless network that substantially conforms to Standard 802.11 a/b/g/n of the IEEE™. In one embodiment, the information comprises a beacon frame transmitted by an access point of the WiFi network space time zone. These beacon frames are detected and processed in one embodiment with MAC processor 107.

In one embodiment, dual mode telephone device 100 also has an audible component 114 such as a speaker, which is coupled to controller 110 and operable therewith to sound an audible signal such as a ring tone upon the telephone detecting an incoming call. A user interface 113 such as an electrical, electromagnetic and/or electromechanical button, switch or dial is coupled to controller 110 and operates therewith to configure a setting relating to the audible component 114. In one implementation, a graphical user interface (GUI) is available with a display component 112 and may also (or alternatively) be used to configure the setting and/or to provide visual indication that an incoming call has been detected.

Cell phone 100 also has a vibrating component 115 such as an integral vibrating buzzer, which provides a signal such as a buzz or similar vibration to alert the user along with the audible and/or visual indications that an incoming call has been detected. In one implementation, upon receipt of a suggestion, warning or the like to change the configuration setting of audible device 113 from 'on' to 'off', a user may elect to suppress the audible device 114 and its potentially troublesome ring tones and the like. The place, time, setting, situation, circumstance or other characteristic associated with a space time zone associated with the network in which cell phone 100 is operable may be inappropriate for sounding an audible signal or for another configuration setting or other property of cell phone 100. Thus, information may be sent to cell phone 100, e.g., by a network entity such as an access point of a WiFi WLAN or a cell phone network transmitter, to suggest to the user to suppress the audible device. It may also then be suggested to activate the vibrational component 115. Complimentary suggestions, e.g., to reactivate the audible component 114 if desired upon the position of the cell phone 100 with respect to the time space zone of the network changes again, such as leaving its vicinity, a time period expiring or the like.

Exemplary Ring Tone Suppression

Figure 3:
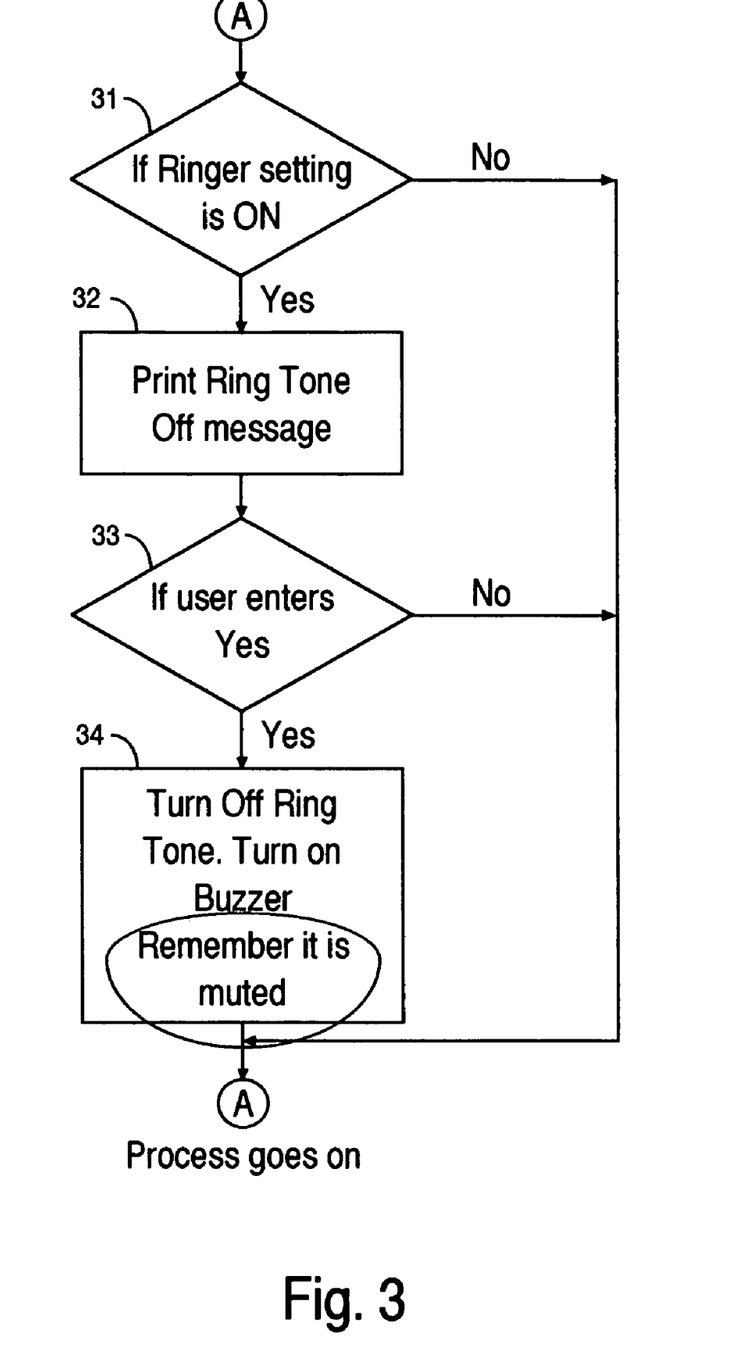
FIG. 3 depicts an exemplary process for suggesting suppression of a cellular telephone audible signal, according to an embodiment of the present invention.

FIG. 3 depicts an exemplary process 30 for suppressing a cellular telephone audible signal, according to an embodiment of the present invention. Process 30 begins with block 31, wherein it is determined whether a configuration setting corresponding to an 'on/off' state of the audible signal of a cell phone is 'on'.

If so, in block 32 a recommendation is made, e.g., with a printed, displayed or other message delivered with visual, audible and/or tactile means, to deactivate, turn off the ring tone or other audible alarm, effectively suppressing it. If it is determined in block 33 that the recommendation is heeded, e.g., that, when, etc. the audile alarm is suppressed, a vibrational signal is activated in its stead, e.g., automatically. Further, the new state of the audible signal is stored and process 30 continues with the recumbence point 'A'.

Figure 4:
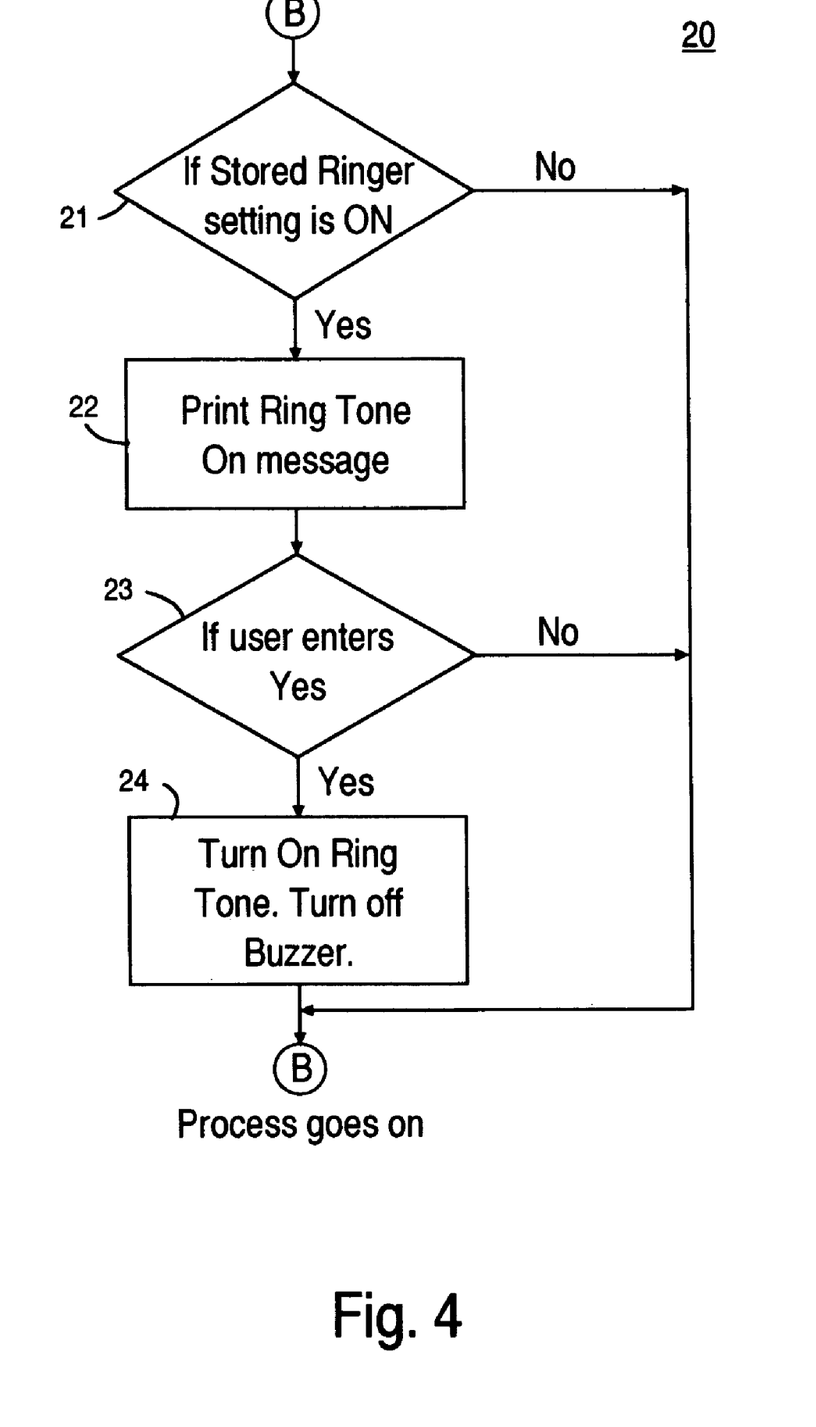
FIG. 4 depicts an exemplary process for suggesting reactivation of a suppressed cellular telephone audible signal, according to an embodiment of the present invention.

FIG. 4 depicts an exemplary process 20 for suggesting reactivation of a suppressed cellular telephone audible signal, according to an embodiment of the present invention. Process 20 begins with block 41, wherein it is determined whether a stored configuration setting corresponding to an 'on/off' state of the audible signal of a cell phone is 'on'.

If so, in block 22 a recommendation is made, e.g., with a printed, displayed or other message delivered with visual, audible and/or tactile means, to activate, turn on the ring tone or other audible alarm, effectively encouraging reactivation thereof. If it is determined in block 33 that the recommendation is heeded, e.g., that, when, etc. the audile alarm is reactivated, the vibrational signal is deactivated, unless another configuration setting relating thereto specifies that it remains active. The process 20 can continue with the recumbence point 'B'.

Exemplary Network Space Time Zone

Figure 5:
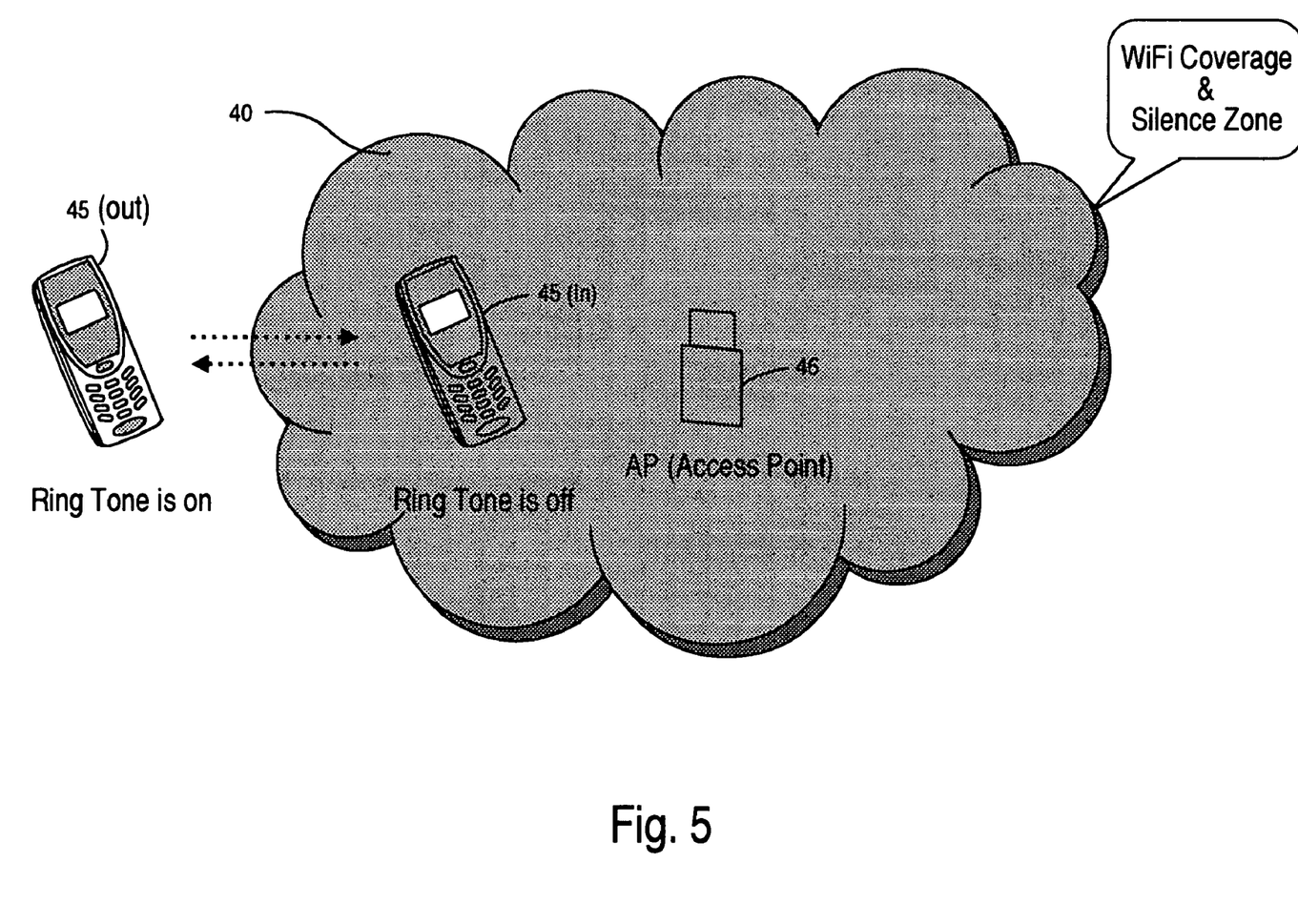
FIG. 5 depicts an exemplary network, according to an embodiment of the present invention.

FIG. 5 depicts an exemplary network 40, according to an embodiment of the present invention. Network 40 has an access point 41. Network 40 can comprise a WLAN such as one that substantially conforms to Standard 802.11 a/b/g/n of the IEEE™ and/or the Bluetooth™ Specification, in which case the entity comprises the access point 41 thereof. The access point 41 in that implementation may comprise a WiFi (Bluetooth™) capable transceiver, antenna, etc. The network 40 may also or alternatively comprise a cellular telephone network cell, in which case the entity comprises a two way wireless transceiver of that cell and/or a mobile telephone switching office (MTSO) associated with that cell.

Information is sent to telephone 45 that relates to the telephone property and a characteristic of the network space time zone, which can complete process 10. In one embodiment, the characteristic comprises a location, a time, and/or a circumstance relating to the network space time zone. Network 40 has the capability of detecting that cellular telephone 45 that it has entered network space time zone 40 and determining a property thereof said telephone and for sending information to telephone 45 that relates to the property thereof and a characteristic of the network space time zone 40. The detecting, determining and sending functions may all reside with and/or accrue to the access point 41.

Embodiments of the present invention, for informing a cellular telephone with configuration data and for suppressing ring tones in a cellular telephone, are thus described. While the present invention has been described in particular embodiments, it should be appreciated that the present invention should not be construed as limited by such embodiments, but rather construed according to the following claims.

What is claimed is:

1. A method for a changing a communication device alarm setting comprising:

detecting a presence of a communication device in a network space-time zone, wherein the network space-time zone corresponds to a location, a time, or a circumstance, or combinations thereof and wherein the space-time zone is associated with a preferred alarm setting; and determining an alarm setting of the communication device, wherein the alarm setting comprises a speaker alarm setting, a vibration alarm setting, or a visual alarm setting, or combinations thereof;

comparing the alarm setting with the preferred alarm setting;

a preconfigured alarm suppression preference to either automatically suppress an alarm or request user intervention to change the alarm setting;

selecting an alarm suppression procedure;

if the preconfigured alarm suppression preference is to automatically suppress the alarm, then sending an alarm setting change command to the communication device to automatically suppress the alarm based on the alarm setting; and otherwise, if the preconfigured alarm suppression preference is to request user intervention to suppress the alarm then sending an alarm setting change request to the communication device to request user intervention to suppress the alarm the request corresponding to the alarm setting.

2. The method as recited in claim 1, wherein if the alarm setting is changed then resetting the alarm setting to the alarm setting that existed just prior to the detection of the communication device in the network space-time zone when the presence of the communication device in the network space-time zone is no longer detected.

3. The method as recited in claim 1, wherein at least one of the detecting the presence of the communication device, the determining the alarm setting, the determining the preconfigured alarm suppression preference, the sending the alarm setting change command, and the sending the alarm setting change request comprise a function of an entity of the network.

4. The method as recited in claim 3, wherein the speaker alarm setting comprises a ring tone.

5. The method as recited in claim 1, wherein sending the alarm setting change command further comprises transmitting the alarm setting change command in an information element via a beacon frame, and wherein sending the alarm setting change request further comprises transmitting the alarm setting change request in an information element via the beacon frame.

6. The method as recited in claim 3, wherein the network comprises a wireless local area network conforming to Standard 802.11 a/b/g/n of the Institute for Electrical and Electronic Engineers.

7. A network node for changing a mobile communication device alarm setting, the network node comprising:
 a detecting unit configured to:
  detect a mobile communication device if the mobile communication device enters a zone within a predetermined proximity of the network node, wherein the zone is associated with a location, a time, or a circumstance, or combinations thereof, wherein the zone is associated with a preferred mobile device alarm setting;
  determine a currently active alarm setting of the mobile communication device, wherein the alarm setting comprises a speaker alarm setting, a vibration alarm setting, or a visual alarm setting, or combinations thereof;
  determine a pre-set alarm suppression preference to either automatically suppress an alarm based on the currently active alarm setting or to request user intervention to suppress the alarm; and
  compare the currently active alarm setting with the preferred mobile device alarm setting; and
 a communication unit configured to send the mobile communication device a message responsive to a determination that the currently active alarm setting does not conform to the preferred mobile device alarm setting;
 wherein if the pre-set alarm suppression preference is to automatically suppress the alarm then the message comprises a command to automatically change the currently active alarm setting to the preferred mobile device alarm setting; and
 wherein if the pre-set alarm suppression preference is to request user intervention to suppress the alarm then the message comprises a request to change the currently active alarm setting to the preferred mobile device alarm setting.

8. The network node as recited in claim 7, wherein the network node further comprises an access point in a wireless local area network, and wherein the speaker alarm setting comprises a ring tone.

9. The network node as recited in claim 7, wherein the communication unit is further configured to send the message as an information element comprising a beacon frame.

10. The network node as recited in claim 8, wherein the wireless local area network substantially conforms to Standard 802.11 a/b/g/n of the Institute for Electrical and Electronic Engineers.

11. The network node as recited in claim 7, wherein the network node comprises a two way wireless transceiver or a mobile telephone network switch, and wherein the message is sent to the mobile communications device via one or more data frames.

12. A computer-readable medium having instructions stored thereon wherein when the instructions are executed by at least one device, the instructions configure the at least one device to:
 detect the presence of a communication device in a spacial zone, wherein the spacial zone corresponds to a location, a time, a circumstance, or combinations thereof and wherein the spacial zone is associated with one or more preferred alert settings for one or more alerts of the communication device;
 determine a current alert setting of the communication device, wherein the current alert setting comprises a speaker alert setting, a vibration alert setting, or a visual alert setting, or combinations thereof;
 determine an alert suppression setting preference to either automatically suppress speaker alerts or to request user intervention to suppress the speaker alerts;
 compare the current alert setting with the preferred alert setting;
 send an alert setting suppression command to the communication device if the alert suppression preference setting is to automatically suppress the speaker alert; and
 send an alert setting change request to the communication device if the alert suppression preference setting is to request a user intervention to suppress the speaker alert.

13. The computer readable medium as recited in claim 12, wherein the at least one device is a node in a network.

14. A network node for changing a mobile communication device alarm setting comprising:
 means for detecting a mobile communication device if the mobile communication device enters a zone within a predetermined proximity of the network node, wherein the zone is associated with a location, a time, or a circumstance, or combinations thereof;
 means for determining a currently active alarm setting of the mobile communication device, wherein an alarm setting comprises a speaker alarm setting, a vibration alarm setting, a visual alarm setting, or combinations thereof;
 means for determining a preconfigured alarm suppression setting comprising either a preference to automatically suppress an alarm based on the currently active alarm setting, or a preference to request user intervention to suppress an alarm of the mobile communication device;
 means for comparing the currently active alarm setting with a preferred alarm setting associated with the zone; and
 means for sending the mobile communication device a message responsive to a determination that the currently active alarm setting does not conform to the preferred alarm setting, wherein the message comprises a command to automatically change the currently active alarm setting to the preferred alarm setting when the preconfigured alarm suppression setting is to automatically suppress the alarm, and wherein the message comprises a request to change the currently active alarm setting to the preferred alarm setting when the preconfigured alarm suppression setting is to request user intervention to suppress the alarm of the mobile communication device.

15. The apparatus as recited in claim 14, wherein the means for sending further comprises means for sending the message as an information element comprising a beacon frame.

16. The method of claim 1, wherein the alarm setting change command comprises a command to change the alarm setting from a speaker alarm setting to a vibration alarm setting, a visual alarms setting, or combinations thereof.

17. The network node of claim 7, further comprising:
resetting the alarm setting of the communication device, to the alarm setting that existed upon initial detection of the mobile communication device in the zone, when the mobile communication device is no longer detected in the zone.

18. The computer readable medium as recited in claim 12, wherein suppressing the alert comprises changing the current alert setting from a speaker alert to a vibration alert, a visual alert, or combinations thereof.

* * * * *

UNITED STATES PATENT AND TRADEMARK OFFICE
CERTIFICATE OF CORRECTION

PATENT NO. : 7,668,557 B2  
APPLICATION NO. : 11/515316  
DATED : February 23, 2010  
INVENTOR(S) : Hong et al.

Page 1 of 1

It is certified that error appears in the above-identified patent and that said Letters Patent is hereby corrected as shown below:

At Title Page, Item (54), please replace "SUPRESSION" with --SUPPRESSION--.
At page 1, Item (56), please replace "tag=rtcol;relnews>." with --tag=rtcol;realnews>.--.
At page 1, Item (56), please replace "Westfield, Prosecution File History for U.S. Appl. No. 09/803,424, filed Mar. 8, 2001, now U.S. Patent No. 6,907,254, issued Jun. 14, 2005.¶Westfield, Prosecution File History for U.S. Appl. No. 09/803,424, filed Mar. 8, 2001, now U.S. Patent No. 6,907,254, issued Jun. 14, 2005." with --Westfield, Prosecution File History for U.S. Appl. No. 09/803,424, filed Mar. 8, 2001, now U.S. Patent No. 6,907,254, issued Jun. 14, 2005.--.
At column 1, line 1, please replace "SUPRESSION" with --SUPPRESSION--.
At column 6, line 43, please replace "a preconfigured alarm" with --determining a preconfigured alarm--.

Signed and Sealed this  
Third Day of May, 2011

David J. Kappos  
*Director of the United States Patent and Trademark Office*